(No Model.)
H. MATTULLATH.
Faucet.
No. 238,300. Patented March 1, 1881.
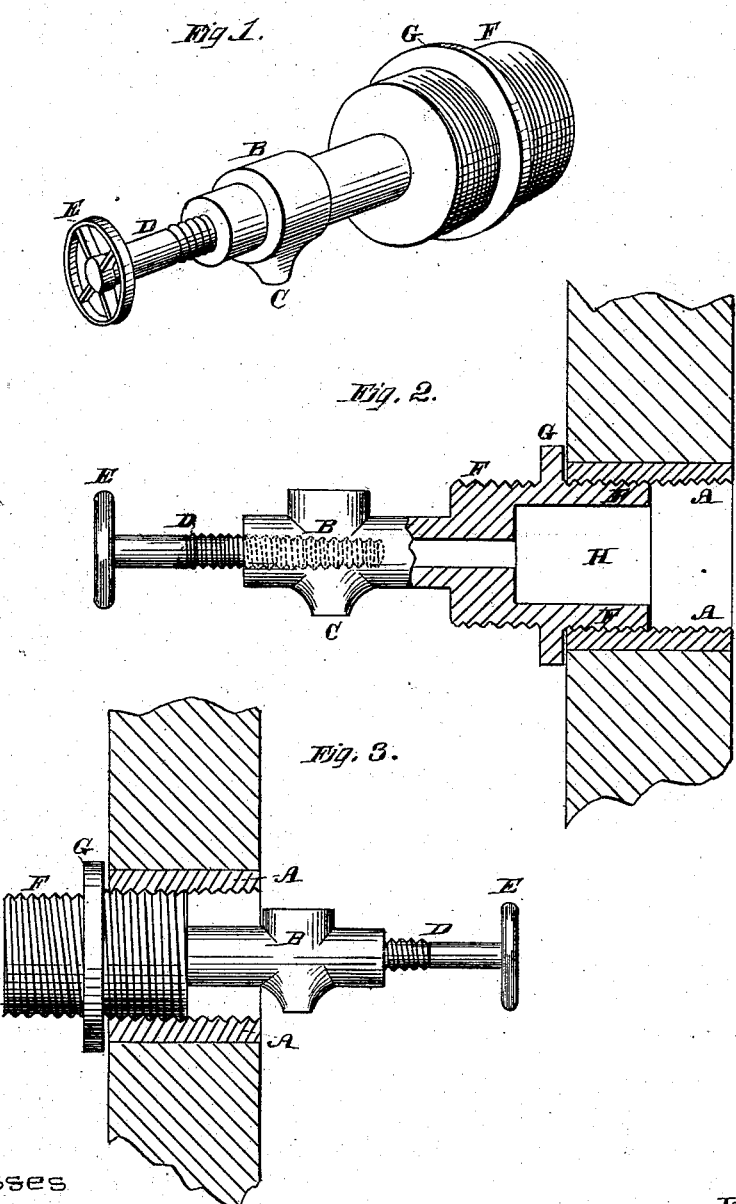
Witnesses
G. H. Towne
Frank A. Brooks
Inventor
Hugo Mattullath

UNITED STATES PATENT OFFICE.

HUGO MATTULLATH, OF SAN FRANCISCO, CALIFORNIA.

FAUCET.

SPECIFICATION forming part of Letters Patent No. 238,300, dated March 1, 1881.

Application filed November 26, 1880. (No model.)

*To all whom it may concern:*

Be it known that I, HUGO MATTULLATH, of the city and county of San Francisco, State of California, have invented an Improved Faucet; and I hereby declare the following to be a full, clear, and exact description thereof.

My invention relates to a novel construction for a faucet which is intended more especially to be used in connection with that class of containing-vessels used for oil, such as metal-lined barrels, or vessels having double sides; and it consists in the formation of a faucet having an enlarged inner end, with a central flange and screw-threads upon each side of it, so that when the vessel or cask is to be transported the faucet may be turned into the cask, and the threaded portion upon that side of the flange screwed into the permanent bushing which is secured in the vessel, thus protecting the faucet. When the vessel is to be tapped the faucet is unscrewed and reversed in the bushing, so that the hand-wheel by which the valve is turned and opened will project outwardly from the cask, as will be more fully described by reference to the accompanying drawings, in which—

Figure 1 is a view of the faucet. Fig. 2 is a longitudinal section of my faucet applied to a cask. Fig. 3 shows it reversed.

In the transportation of oils, metal or metal-lined casks or vessels are largely employed, on account of their superior tightness; but with such casks it is difficult to fit a faucet by which to draw off the contents, and a properly-fitted faucet would ordinarily have to be sent in a separate package. My invention is intended to supply this need and overcome the difficulty. It is accomplished by fitting a bushing, A, into the cask, this bushing having its interior threaded to receive the screw of the faucet. Any suitable form of faucet may be employed; but I have shown in the present case a faucet, B, having a conical valve fitting a similar seat within it and between the cask and the nozzle C. This valve is opened and closed by means of a screw-threaded spindle, D, which is operated by the hand-wheel, E. The inner end of the faucet is provided with an enlarged head, F, having a diameter greater than that of the hand-wheel, E, and provided with screw-threads, so as to fit the bushing A. Near the center of this head is formed a flange, G, which serves as a shoulder to fit against the bushing when the head is screwed into it. This flange may have its periphery made preferably hexagonal or of any suitable form to receive a wrench, by which the faucet may be inserted. The head has screw-threads upon each side of the flange, and when the cask is to be transported the faucet is reversed and the hand-wheel and faucet passed through the bushing to the interior of the cask. The screw-threads upon that end of the head are thus turned into the bushing until the flange G is drawn snugly against the face of the bushing to make a tight joint. The threaded portion of the head F, upon the opposite side of the flange, will then project slightly, but should not project beyond the flange or chine of the barrel or vessel, being thus protected from injury.

It may also be found advisable to protect the screw-threads by a light metal or other cap, which can be easily removed when necessary.

The end of the cap opposite the faucet may also have a square opening, H, formed in it, as shown, to admit a square plug or wrench for the purpose of removing it.

It will be seen that if desired, the bushing may have a seat near its inner end, and the end of the head F screwed against it to form a tight joint, when the flange G could be omitted; but the flange will be found more convenient, as it serves as a nut by which to remove or replace the faucet.

By this construction I am enabled to fit each package with a faucet when it is shipped, so that it may be tapped ready for use when it arrives at its destination without other difficulty, while the faucet is entirely protected from injury.

Having thus described my invention, what I claim as new, and desire to secure by Letters Patent, is—

1. The faucet B, with the enlarged head F fitted to the bushing A, and having a diameter greater than that of the faucet or the device E, by which it is opened and closed, whereby the faucet may be reversed in the cask for transportation and protection, substantially as herein described.

2. The faucet having the enlarged head F, with its central flange, G, the head having screw-threads formed upon each side of the flange, so that it may be inserted into the bushing from either direction and the faucet reversed, substantially as herein described.

3. A faucet for casks or other containing-packages, consisting of a faucet body and valve, an opening and closing device, E, and a head, F, of larger diameter than these parts, adapted to be secured within the cask from either end, whereby the faucet may be removed to seal the cask or to tap it, substantially as herein described.

In witness whereof I have hereunto set my hand.

HUGO MATTULLATH.

Witnesses:
S. H. NOURSE,
FRANK A. BROOKS.